United States Patent
Herges et al.

(10) Patent No.: US 7,888,817 B2
(45) Date of Patent: Feb. 15, 2011

(54) TEMPORARY VOLTAGE SUPPLY

(75) Inventors: Michael Herges, Munich (DE); Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 287 days.

(21) Appl. No.: 12/138,102

(22) Filed: Jun. 12, 2008

(65) Prior Publication Data
US 2009/0146496 A1 Jun. 11, 2009

Related U.S. Application Data

(63) Continuation of application No. PCT/EP2006/011828, filed on Dec. 8, 2006.

(30) Foreign Application Priority Data
Dec. 12, 2005 (DE) ........................ 10 2005 059 246

(51) Int. Cl.
*H02J 9/06* (2006.01)
(52) U.S. Cl. ........................................ 307/64
(58) Field of Classification Search ............. 307/64–66
See application file for complete search history.

(56) References Cited

U.S. PATENT DOCUMENTS

| 5,739,594 | A * | 4/1998 | Sheppard et al. ............... 307/64 |
| 6,152,545 | A | 11/2000 | Mauser et al. |
| 6,330,463 | B1 | 12/2001 | Hedrich |
| 7,015,830 | B2 * | 3/2006 | Flick ........................... 340/989 |

| 2005/0000763 | A1 | 1/2005 | Haffelder et al. |

FOREIGN PATENT DOCUMENTS

| DE | 196 43 949 A1 | 6/1998 |
| DE | 197 43 305 A1 | 4/1999 |
| DE | 197 58 289 A1 | 7/1999 |
| DE | 103 24 809 A1 | 12/2004 |
| EP | 0 453 236 A1 | 10/1991 |
| EP | 0 624 944 A2 | 11/1994 |
| EP | 0 924 834 A2 | 6/1999 |
| WO | WO 00/00374 A1 | 1/2000 |

OTHER PUBLICATIONS

Data Sheet, "Aluminum electrolytic capacitors", Series/Type: B41692/B41792, EPCOS AG, Jul. 2005.
Data Sheet, 1N4148; 1N4448, High-speed diodes, Philips Semiconductors Jan. 23, 2002.
International Search Report dated Apr. 4, 2007 with an English translation (Four (4) pages).
International Preliminary Report on Patentability dated Jun. 18, 2008 including English translation (Fifteen (15) pages).

* cited by examiner

*Primary Examiner*—Albert W Paladini
(74) *Attorney, Agent, or Firm*—Crowell & Moring LLP

(57) ABSTRACT

A temporary voltage supply for a consumer includes a switching device with an auxiliary power supply; a control device supplied by the auxiliary power supply if an operating power supply fails; and a switching device which is activated by the control device and actuates the consumer via auxiliary power from the auxiliary power supply. The auxiliary power supply is configured in such a manner that, upon request, by actuation of a switch, the control device is provided with a sufficient amount of power for a final operating sequence after the operating power supply fails.

11 Claims, 1 Drawing Sheet

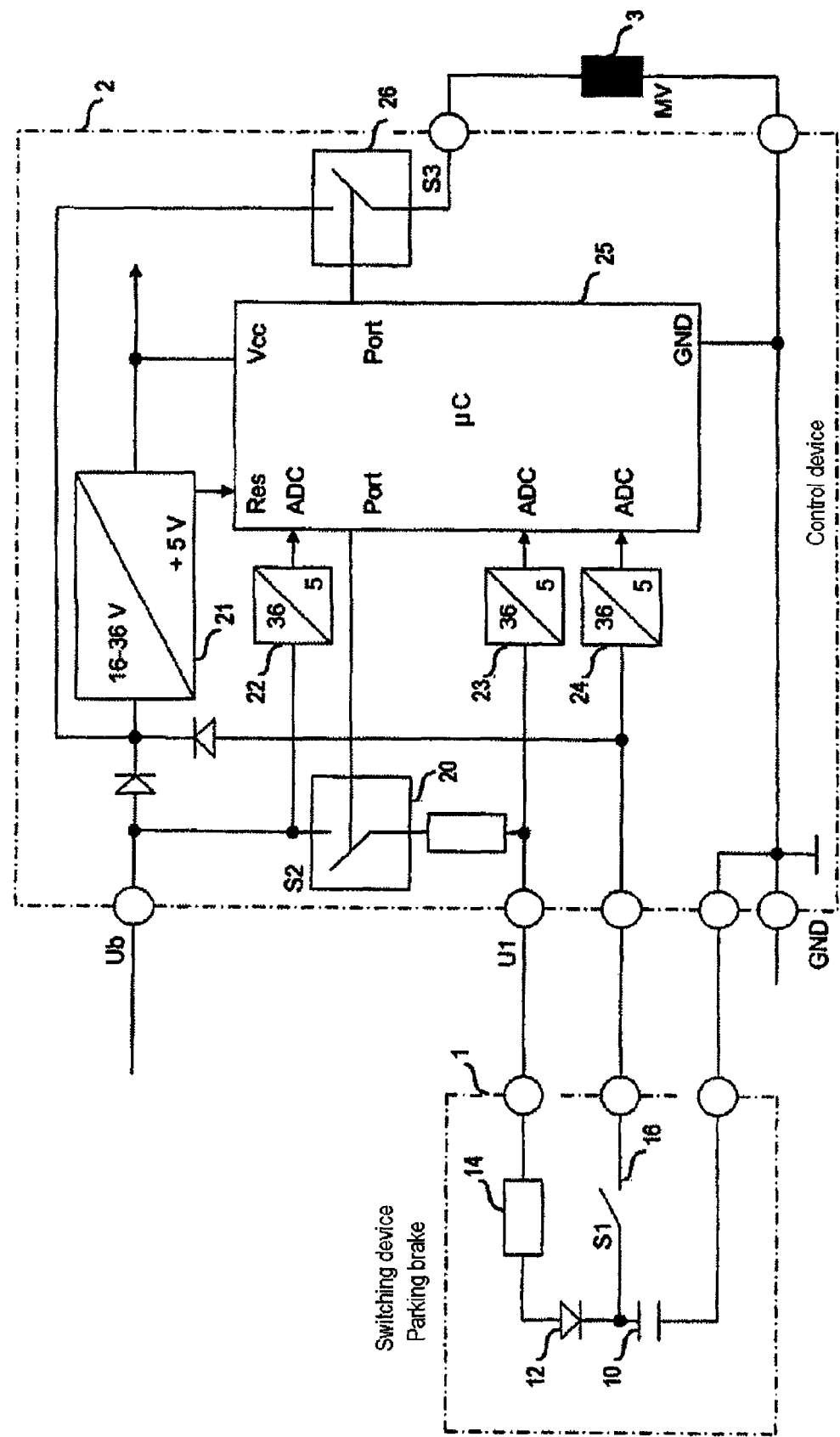

TEMPORARY VOLTAGE SUPPLY

CROSS-REFERENCE TO RELATED APPLICATIONS

This application is a continuation of PCT International Application No. PCT/EP2006/011828, filed on Dec. 8, 2006, which claims priority under 35 U.S.C. §119 to German Application No. 10 2005 059 246.5, filed Dec. 12, 2005, the entire disclosures of which are expressly incorporated by reference herein.

BACKGROUND AND SUMMARY OF THE INVENTION

The invention relates to a device for a voltage supply and, in particular, to a circuit arrangement for a temporary voltage supply of electrical systems.

In electrical systems, there are frequently safety-related devices which have to have sufficient energy available not only when normal switching off processes occur but also, for example, when the normal operating current supply or operating voltage supply fails, in order to be able to still carry out a final operating sequence and, therefore, be able to arrive at a defined, safe state.

An example of this is an electronically controlled parking brake system for commercial vehicles. If the parking brake is not activated in such a system when there is a failure of the electricity supply, for example as a result of a short circuit in the vehicle battery, there is, on the one hand, the risk that it will no longer be possible to park the vehicle safely. However, on the other hand, when there is a failure of the electricity supply, the parking brake cannot be activated simultaneously and automatically in all cases because if a vehicle has not yet arrived at a stationary state brake actuation could lead to an unstable driving behavior and to a strong deceleration without the brake lights lighting up, as a result of which the risk of an accident is significantly increased. Therefore, after the vehicle has arrived at a stationary state when the electricity supply has failed, such a parking brake must be capable of being activated once more by the driver so that the vehicle can remain secured against rolling away.

Until now, such problems have been avoided by use of redundant voltage supplies from at least two large-capacity energy stores, which are alternately safeguarded with respect to one another or by use of an independent emergency power supply, i.e. one which is arranged separately. However, the known solutions are disadvantageous in that a plurality of energy stores are expensive and complicated to implement and, in addition, are difficult to monitor, and a separate emergency power supply has to be heavily overdimensioned owing to permanent self-discharging, which also results in high costs and a high degree of structural complexity.

In addition, the required energy for carrying out a final operating sequence (a "final action") of the parking brake is frequently small, with the result that the known solutions do not correspond to the actual requirements in any way.

The invention is therefore based on providing a temporary voltage supply, which makes available the energy required for a final operating sequence of an electric system in the event of a fault in a cost effective and simple way.

The invention is based on the idea that for an electrical system, a small amount of energy is sufficient to be able to carry out a final process which gives rise to a safe and defined end state. Such an amount of energy is made available from an auxiliary power supply which, by virtue of being arranged directly in a switching device with short line paths and dividing elements, is protected against self-discharging such that overdimensioning of the auxiliary power supply or a separate emergency power supply can be dispensed with.

In particular, such a temporary voltage supply for a load comprises a switching device with an auxiliary power supply, a control device which is supplied by the auxiliary power supply if an operating power supply fails, and a switching device which is actuated by the control device and which activates the load by way of the auxiliary power from the auxiliary power supply. The auxiliary power supply is configured in such a way that sufficient energy for an operating sequence, which is the last sequence after the failure of the operating power supply, is made available to the control device on request by actuating a switch.

The switching device preferably has a diode arrangement with a low cut-off current, which counteracts self-discharging of the auxiliary power supply. As a result, the auxiliary power supply can be dimensioned in accordance with the requirements of the control device to be supplied.

Furthermore, the diode arrangement is activated automatically if the operating power supply fails, with the result that self-discharging losses are minimized and the time during which the control device can be operated by way of the energy from the auxiliary power supply is prolonged.

In addition, the auxiliary power supply and the diode arrangement are advantageously arranged in the immediate vicinity of the switch, as a result of which an undesired voltage drop on relatively long line sections is avoided.

The auxiliary power supply is advantageously a capacitor, particularly preferably an electrolyte capacitor with a voltage of the order of magnitude of 40 V and with a capacitance of the order of magnitude of 3000 µF.

The self-discharging of the auxiliary power supply can be monitored by the control device, preferably by temporarily disconnecting the charge circuit of the auxiliary power supply and measuring the voltage which occurs at the auxiliary power supply after a predetermined time, or by sensing the time up to the time at which the voltage of the auxiliary power supply has dropped to a predetermined value.

The control device also preferably determines the available power of the auxiliary power supply by monitoring the voltage drop between the operating power supply and a voltage at the switching device, and calculating the charge current from the voltage drop between the operating power supply and the voltage at the switching device.

The auxiliary power supply is advantageously continuously connected to the operating power supply, but a defined charge state of the auxiliary power supply can be monitored by virtue of the fact that the auxiliary power supply is regularly disconnected from the operating power supply for a predetermined time by way of a switch in the control device.

Other objects, advantages and novel features of the present invention will become apparent from the following detailed description when considered in conjunction with the accompanying drawing.

BRIEF DESCRIPTION OF THE DRAWING

The single FIGURE is a simplified view of a circuit arrangement of a temporary voltage supply according to a preferred exemplary embodiment.

DETAILED DESCRIPTION OF THE DRAWING

The FIGURE shows a detail of an exemplary implementation of the provision of auxiliary power to a parking brake in a commercial vehicle after the operating power supply has failed. The implementation is not restricted here to commercial vehicles, but rather can also be applied in other movable objects which are equipped with an electronically controlled parking brake for securing a stationary position of the movable object.

A switching device or a switch 1, arranged in a driver's cab of a commercial vehicle, for a parking brake is shown on the left-hand side of the FIGURE. The switching device or switch arranged in the driver's cabin is connected to corresponding signal lines with a control device 2 which is also arranged in the commercial vehicle and is shown on the right-hand side of the FIGURE.

A capacitor 10, preferably an electrolytic capacitor, a diode arrangement 12, a resistance arrangement 14, and a switch S1 16 are arranged in the switching device 1.

The control device 2 of the electronic system includes, as an element which is significant for the exemplary embodiment, a switch S2 20, which is connected via a resistor R between a supply voltage or operating voltage Ub and a voltage U1 of the switching device 1.

The control device 2 is known per se and is therefore not described in more detail here. It includes essentially a number of diodes and voltage transformers 21 to 24 as the external wiring of a microcontroller 25 which, by way of an implemented operating sequence, controls the parking brake by actuating a switch S3 26.

The switch S3 26, in turn, actuates a valve MV 3, for example a solenoid valve, which is connected to an output of the control device 2 and then activates the parking brake (not shown).

The fundamental method of operation of the exemplary embodiment will be explained in greater detail below.

It will be assumed that the commercial vehicle is operating or moving. If the operating power supply Ub fails at this time, the electronic system for the parking brake is firstly without a supply and is not connected to an auxiliary power supply 10 until an operator or driver issues a corresponding instruction. In response to this instruction, the electrical system carries out a final operating sequence with the power from the auxiliary power supply 10, and then the electrical system switches itself off or is inevitably switched off due to a lack of power.

In this case, the control device 2 must initially be returned to an operationally capable state from the currentless state, which results from the failure of the operating power supply Ub. The control device 2 must then detect the situation which is actually present, i.e. the failure of the operating power supply Ub, and instead detect the operation with auxiliary power and, in response, place the solenoid valve 3, which may be a bistable solenoid valve, in a correspondingly different state.

This change into another state requires only a small amount of energy so that the capacitor 10, which forms the energy store for the auxiliary power, can be relatively small, e.g. can be configured as a 40 V capacitor with a capacitance of 3000 μF.

However, if the voltage of such a capacitor 10 is coupled-in via long connecting lines, plugs or the like, this results in low insulating resistances of the order of magnitude of only a few MΩ, and such a capacitor will then discharge itself after only a short time.

For this reason, the capacitor 10, which forms the auxiliary power supply or auxiliary power source, is preferably arranged directly at or in the switch S1 16.

In addition, during normal operation of the electrical system, the capacitor 10 is continuously connected to the operating power supply Ub, with the result that a sufficient charge state of the capacitor 10, and therefore of the auxiliary power supply, is ensured at all times. If the operating power supply Ub fails, the capacitor 10 is prevented from discharging via the current paths of the operating power supply Ub by disconnecting the capacitor 10 therefrom by way of the diode arrangement 12, which has very high impedance in the disconnecting state and therefore acts as a disconnecting device (diode) with a low cut-off current. The diode arrangement 12 is preferably activated automatically, and for the above-mentioned reasons the diode arrangement 12 is also arranged in the immediate vicinity of the capacitor 10.

As a result of the concentrated arrangement of elements of the switching device 1 for the parking brake, when there is a failure of the operating power supply Ub, only short line sections conduct a voltage, as a result of which, in a state in which the operating power supply Ub is no longer available but the last operating sequence as not yet been requested, the total insulating resistance of the switching device has an order of magnitude of several GΩ, and is therefore very high.

The self-discharging of the capacitor 10 as an auxiliary power supply is therefore very low, with the result that the time period in which the last operating sequence of the electronic system can still be carried out after the operating power supply Ub has failed can significantly be extended to hours or days without the auxiliary power supply, i.e. the capacitor 10, having to become unnecessarily large or having to be overdimensioned.

The switch S2 20 in the control device 2 preferably also interrupts the charging process of the capacitor 10 in the switching device 1 from time to time for a predetermined time, for example for several hours, during normal operation with an intact operating power supply Ub. The capacitor 10 can therefore slowly discharge during this time. After the predetermined time has elapsed, the switch S2 20 is closed again, and the capacitor 10 is charged until the desired auxiliary power level is reached. The capacitance of the capacitor 10 can be tested, for example, by measuring the time until the capacitor 10 is completely charged after switching on occurs again.

The self-discharging of the capacitor 10 is monitored here by the control device 1 such that the charge current circuit is temporarily disconnected by the switch S2 20 and the voltage which occurs at the capacitor 10 after a predetermined time after switching on occurs is measured.

In addition, the auxiliary power, which is available at a specific time, can be determined via the control device 1 by monitoring the battery voltage Ub and the switching device voltage U1 and the charge current, which is calculated by the voltage drop between the battery voltage Ub and the switching device voltage U1.

In particular, by measuring the voltage U1 of the switching device 1 during recharging or charging of the capacitor 10, it is possible to infer the degree of self-discharging of the capacitor 10, and the minimum capacitance of the capacitor 10 can be monitored by reference to the charging speed of the capacitor 10 in the course of the recharging process.

The switching device 1 preferably has switches or potentiometers or other elements which sense an instruction from an operator, which are redundant for the switch 16 and which are not shown. Such elements serve to issue a warning during fault-free operation and to prevent incorrect triggering of the last operating sequence of the electronic system.

As a result, by activating the switch S1 16 of the switching device 1, it is possible to apply the parking brake of the utility vehicle by briefly actuating the solenoid valve MV 3, and in the event of a failure of the operating power supply Ub, the power supply to the control device 2 and therefore to the computing device (microcontroller) 25 contained therein, as well as to the solenoid valve MV 3, is ensured by virtue of the auxiliary power from the capacitor 10 in the switching device 1.

| Table of reference numerals | |
|---|---|
| 1 | Switching device |
| 2 | Control device |
| 3 | Solenoid valve |
| 10 | Capacitor |
| 12 | Diode |
| 14 | Resistor |
| 16 | Switch |
| 20 | Switch |
| 21 | Voltage transformer |
| 22 | Voltage transformer |
| 23 | Voltage transformer |
| 24 | Voltage transformer |
| 25 | Microcontroller |
| 26 | Switch |

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A temporary voltage supply for a load, comprising:
   a first switching device including an auxiliary power supply;
   a control device operatively configured to be supplied with auxiliary power by the auxiliary power supply if an operating power supply fails; and
   a second switching device operatively configured for actuation by the control device, the second switching device activating the load via the auxiliary power from the auxiliary power supply;
   wherein the auxiliary power supply is operatively configured such that sufficient power is made available to the control device on request by actuating a switch disposed in the first switching device to provide sufficient power for a final operating sequence after failure of the operating power supply.

2. The temporary voltage supply as claimed in claim 1, wherein the first switching device has a diode arrangement with a low cut-off current, which counteracts self-discharging of the auxiliary power supply.

3. The temporary voltage supply as claimed in claim 2, wherein the diode arrangement is activated automatically if the operating power supply fails.

4. The temporary voltage supply as claimed in claim 2, wherein the auxiliary power supply and the diode arrangement are arranged in an immediate vicinity of the switch.

5. The temporary voltage supply as claimed in claim 1, wherein the auxiliary power supply is a capacitor.

6. The temporary power supply as claimed in claim 5, wherein the capacitor is an electrolytic capacitor having a voltage of the order of magnitude of 40 V and a capacitance of the order of magnitude of 3000 μF.

7. The temporary voltage supply as claimed in claim 1, wherein self-discharging of the auxiliary power supply is monitored by the control device.

8. The temporary voltage supply as claimed in claim 7, wherein the control device senses the self-discharging of the auxiliary power supply by temporarily disconnecting a charge circuit of the auxiliary power supply and measuring a voltage which occurs at the auxiliary power supply after a predetermined time.

9. The temporary voltage supply as claimed in claim 1, wherein the control device determines an available energy of the auxiliary power supply by monitoring a voltage drop between the operating power supply and a voltage at the first switching device and calculating a charge current from the voltage drop between the operating power supply and the voltage and/or by monitoring the charge time up to the time when a fully charged state of the capacitor is reached.

10. The temporary voltage supply as claimed in claim 1, wherein the auxiliary power supply is continuously connected to the operating power supply.

11. The temporary voltage supply as claimed in claim 1, wherein the auxiliary power supply is regularly disconnected from the operating power supply for a predetermined time via a second switch in the control device.

* * * * *